United States Patent [19]

Tsujiuchi et al.

[11] Patent Number: 4,711,054
[45] Date of Patent: Dec. 8, 1987

[54] GRINDING MACHINE WITH A STEADY REST

[75] Inventors: Toshio Tsujiuchi; Yoshinori Shinmura; Yukio Oda, all of Kariya, Japan

[73] Assignee: Toyoda Koki Kabushiki Kaisha, Kariya, Japan

[21] Appl. No.: 924,777

[22] Filed: Oct. 30, 1986

[30] Foreign Application Priority Data

Nov. 4, 1985 [JP] Japan ............................ 60-247816

[51] Int. Cl.$^4$ ............................................ B24B 49/02
[52] U.S. Cl. ................................. 51/165.77; 51/238 S
[58] Field of Search ............. 51/238 R, 238 S, 165.77, 51/165.71, 165.91

[56] References Cited

U.S. PATENT DOCUMENTS

| | | | |
|---|---|---|---|
| 3,934,376 | 1/1976 | Tamesui et al. | 51/165.91 |
| 3,967,414 | 7/1976 | Tamesui et al. | 51/165.77 |
| 4,201,016 | 5/1980 | Kirk | 51/165.77 |
| 4,205,492 | 6/1980 | Matsuura | 51/238 S |
| 4,324,073 | 4/1982 | Belthle | 51/165.77 |

FOREIGN PATENT DOCUMENTS 55-31560 3/1980 Japan .

*Primary Examiner*—Harold D. Whitehead
*Attorney, Agent, or Firm*—Oblon, Fisher, Spivak, McClelland, & Maier

[57] ABSTRACT

In a numerical control grinding machine using a grinding wheel made of cubic boron nitride, a computerized numerical controller controls the infeed movement of a wheel head to effect a rough grinding and a first fine grinding on a rotating cylindrical workpiece by the grinding wheel and to halt the first fine grinding in response to a sizing signal from a sizing device which measures the diameter of the workpiece being ground. At the halt of the first fine grinding, the numerical controller advances rest jaws to press the workpiece upon the grinding wheel until another sizing signal is issued from the sizing device. Until the number of the workpieces ground after each truing operation reaches a predetermined number, the numerical controller increase the infeed rate of the grinding wheel in each of the rough and first fine grindings toward a desired infeed rate on a step-by-step basis. Further, the numerical controller diminishes a set size which determines the time point to issue the first-mentioned sizing signal from the sizing device, toward a desired set size on a step-by-step basis with the increases in number of the workpiece ground after each truing.

6 Claims, 9 Drawing Figures

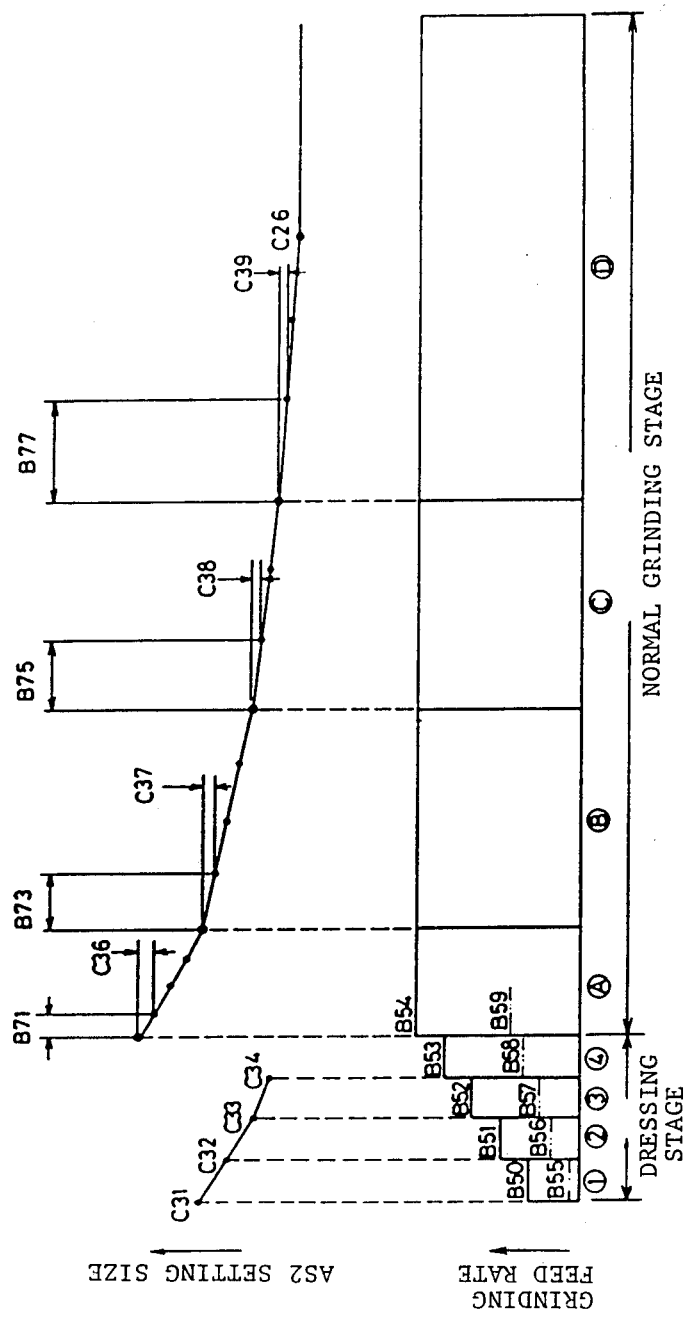

GRINDING MACHINE WITH A STEADY REST

BACKGROUND OF THE INVENTION

1. Field of the Invention

The present invention relates to a grinding machine with a steady rest wherein in response to a signal issued from a sizing device when a workpiece being ground reaches a predetermined size, the infeed movement of a grinding wheel carrier is stopped and instead, the feed movement of a jaw of the steady rest is initiated to press the workpiece upon a grinding wheel.

2. Discussion of the Prior Art

In a grinding machine having a steady rest, a signal AS2 is issued from a sizing device when a cylindrical workpiece is ground to a predetermined intermediate size, as shown in FIG. 6. In response to the signal AS2, the infeed movement of a grinding wheel is halted and instead, a jaw of the steady rest is advanced toward the grinding wheel so as to cause the workpiece to be ground by the grinding wheel. Then, the infeed movement of the grinding wheel is resumed to grind the workpiece to a predetermined finish size.

However, in the case where there is used a grinding wheel made of cubic boron nitride, the flexing amount that the workpiece has when the feed movement of the rest jaw is initiated varies largely because the grinding wheel has a peculiar property that its grinding capability is small right after the truing, but is improved as the stock removal thereby increases. Thus, a longer grinding cycle time is required to secure a desired roundness on the finish workpieces.

More specifically, at the stage that the grinding wheel has a small grinding capability right after each truing thereon, the workpiece W has been flexed a large amount ($\delta 1$) toward the rest jaw T when the sizing device issues a signal representing the grinding of the workpiece to an intermediate set size DAS, as shown in FIG. 7(a). When the rest jaw T is advanced thereafter, the workpiece W is returned by its spring-back motion toward the grinding wheel G at the early stage of such advance movement of the rest jaw, whereby it is ground to be diminished by (d), as shown in FIG. 7(a). Therefore, in order that a desired roundness can be secured after the grinding caused by the spring-back motion of the workpiece W and that an allowance (L1) can be left which is necessary for the subsequent grinding by the feed of the rest jaw T and for the later fine grinding by the re-infeed of the grinding wheel G, the signal AS2 from the sizing device has to be issued earlier taking into consideration the allowance (d) ground upon the spring-back motion of the workpiece W.

However, if such is done, the following drawback occurs. That is, when the grinding capability of the wheel G is improved, the flexing amount ($\delta$) the workpiece W has upon issuance of the sizing signal AS2 decreases from ($\delta 1$) to ($\delta 2$), as shown in FIG. 7(b), and the allowance ground by the spring-back motion of the workpiece W also decreases from (d) to (d'). As a consequence, the allowance which is to be ground by the feed of the rest jaw T increases from (L1) to (L2), thereby resulting in a longer machining cycle time and hence, in the degradation of productivity.

SUMMARY OF THE INVENTION

It is therefore a primary object of the present invention to provide an improved grinding machine capable of varying the time point at which a sizing device issues a sizing signal to halt the infeed of a grinding wheel against a rotating cylindrical workpiece and to advance a jaw of a steady rest, in conjunction with the increase in number of the workpieces ground after each truing operation of the grinding wheel.

Another object of the present invention is to provide an improved grinding machine wherein an allowance for a profile correction by the infeed of a rest jaw as well as for a fine grinding can be maintained constant notwithstanding that the grinding capability which a grinding wheel made of cubic boron nitride has after each truing operation varies largely with the increase in number of the workpieces ground after each truing operation.

Briefly, according to the present invention, there is provided a grinding machine wherein a wheel head rotatably carrying a grinding wheel is infed by a first feed mechanism against a rotating workpiece, toward which a jaw of a steady rest is moved by a second feed mechanism. A sizing device measures the diameter of the workpiece being ground and outputs a signal representing the measured diameter. A resister is provided for storing a set size, and a comparator responsive to the signal from the sizing device outputs a sizing signal when the measured diameter coincides with the set size stored in the register. A numerical controller controls the first feed mechanism to first grind the workpiece and halts the grinding in response to the sizing signal from the comparator. The numerical controller also controls the second feed mechanism to advance the rest jaw in response to the sizing signal so that the workpiece is pressed by said rest jaw upon the grinding wheel. The numerical controller varies the set size stored in the register with the increase in number of workpieces ground after each truing of the grinding wheel.

With this configuration, the time point at which the sizing signal is output from the comparator for halting the infeed movement of the grinding wheel and for initiating the feed movement of the rest jaw is delayed as the grinding capability of the grinding wheel is improved by the repetition of the grinding operation. That is, as the flexing of the workpiece in each grinding cycle decreases with the improvement in the grinding wheel capability, the workpiece diameter which determines the time point to issue the sizing signal is diminished gradually. Therefore, the workpiece can be ground to a predetermined size when it returns to the right position by its spring-back motion upon the halt of the infeed of the grinding wheel and prior to the feed movement of the rest jaw. This advantageously results in securing an allowance which is required for the grinding by the subsequent feed of the rest jaw as well as by the re-infeed of the grinding wheel, so that the roundness of the finished workpieces can be highly maintained without the substantial prolongation of machining cycle time.

In another aspect of the present invention, until the number of workpieces ground after each truing operation reaches a predetermined number, the infeed rate of the grinding wheel against the workpiece is increased toward a desired feed rate, while the workpiece size which determines the time point to issue the sizing signal is diminished. This advantageously results in highly maintaining the accuracy of the finished workpieces even at the early stage after each truing of the grinding wheel.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

Figure 2:
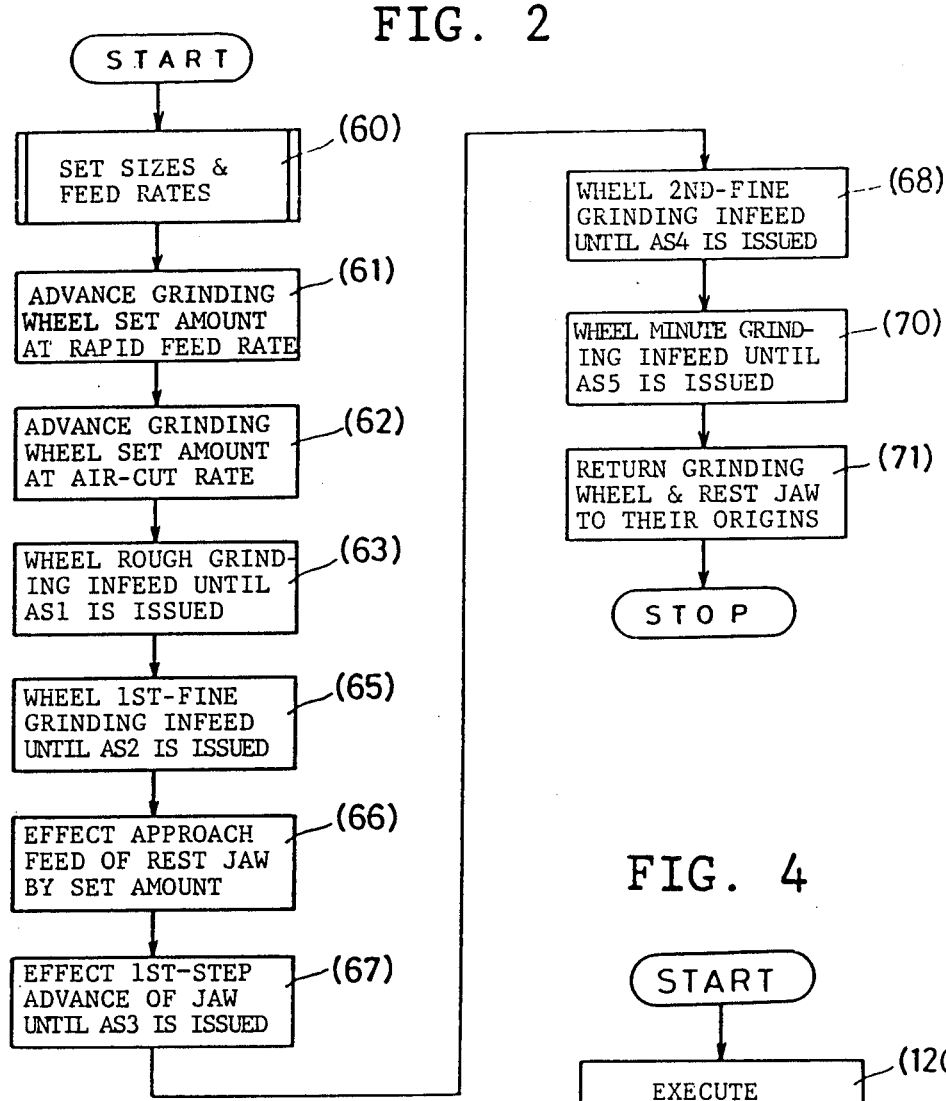
FIG. 2 is a flow chart of a system control program executed by a central processing unit of the numerical controller.
Figure 4:
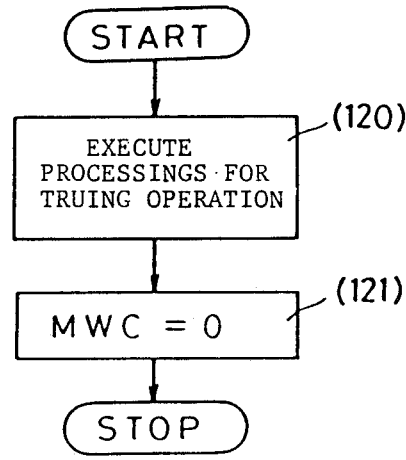
Figure 3A:
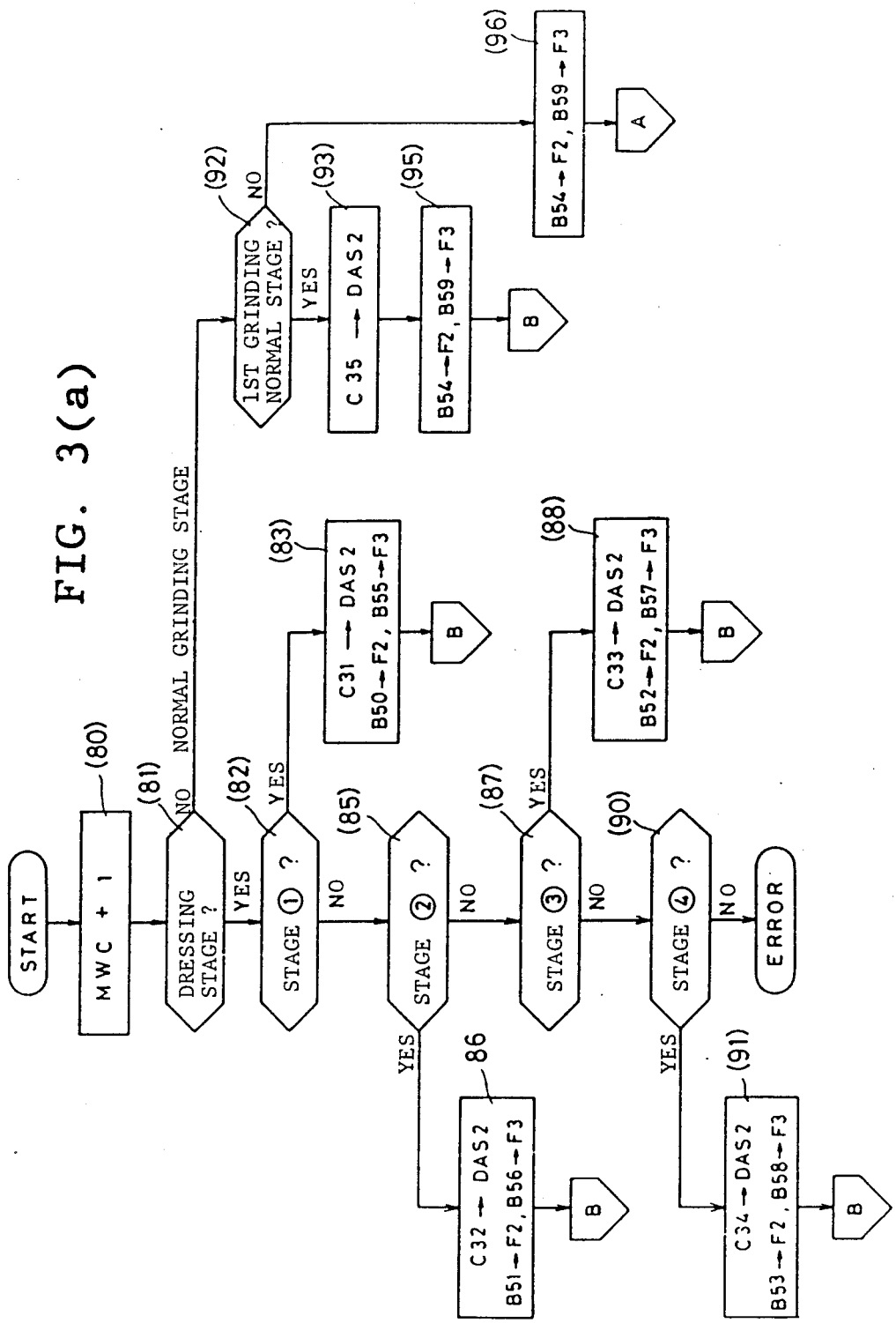
Figure 3B:
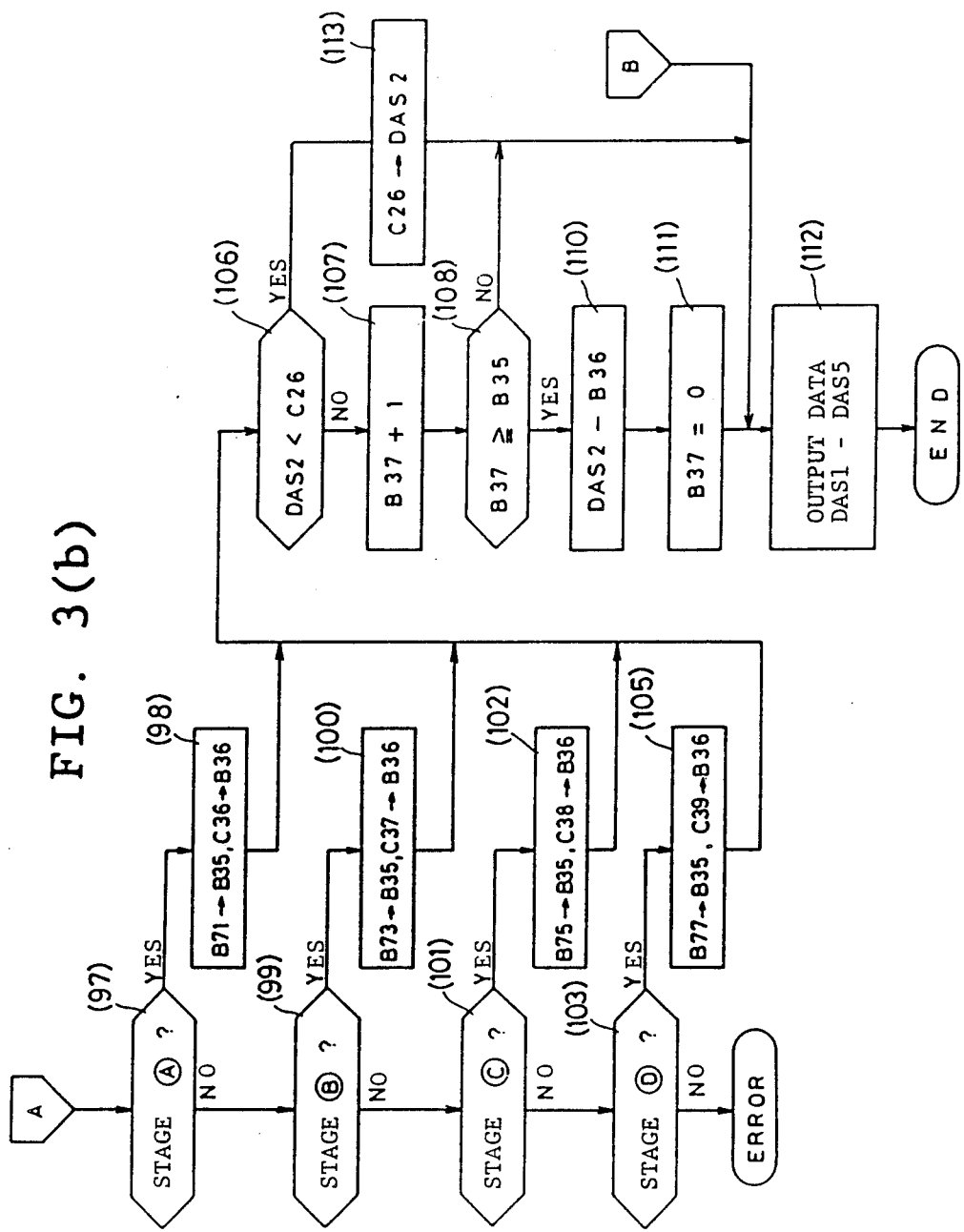
Figure 6:
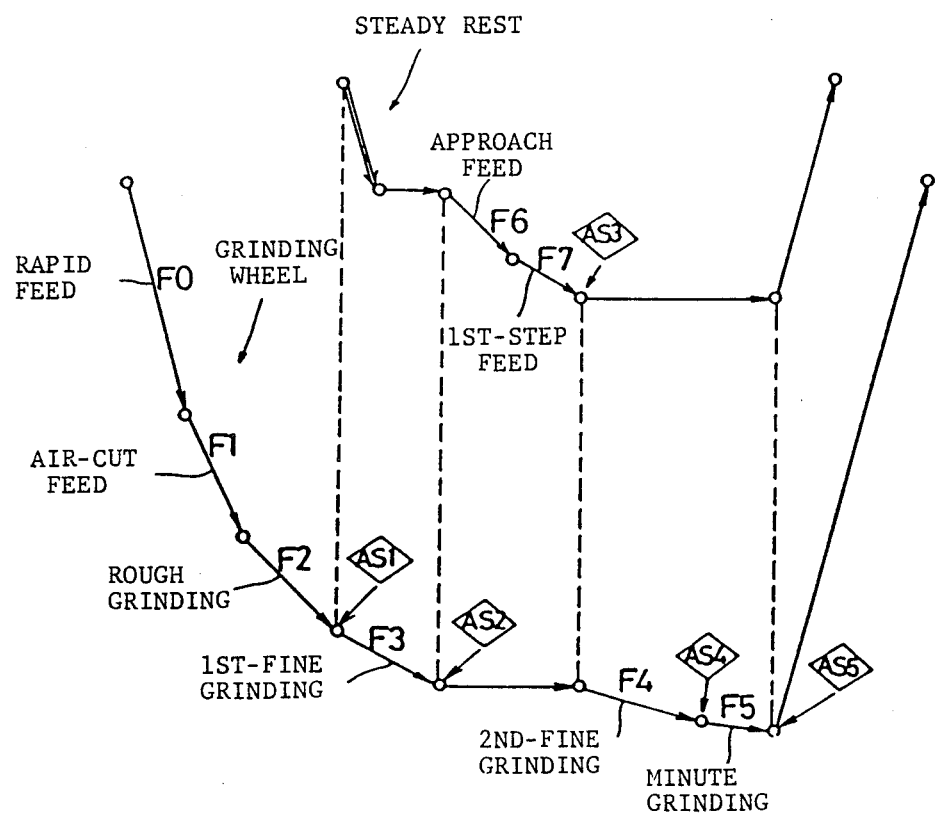
Figure 7A:
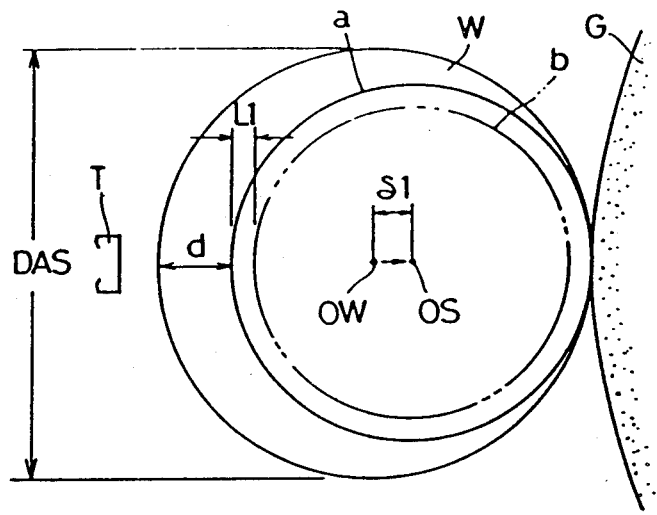
Figure 7B:
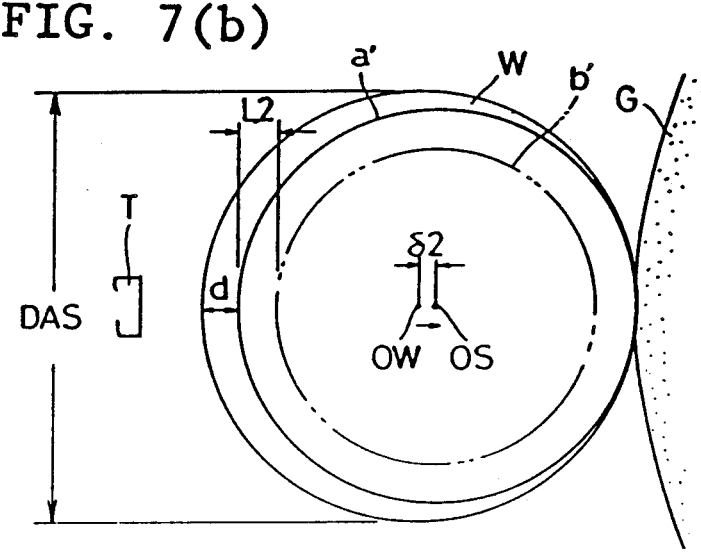

FIGS. 3(a) and 3(b) are flow charts of a subroutine executed by the central processing unit at step 60 of FIG. 2;

FIG. 4 is a flow chart of another subroutine executed by the central processing unit for truing a grinding wheel of the grinding machine;

FIG. 5 is a graph showing the variation of a sizing point AS2, a rough grinding infeed rate and a fine grinding infeed rate in connection with the number of workpieces ground after each operation;

FIG. 6 is a grinding cycle chart showing feed movements of the grinding wheel and a rest jaw performed in accordance with the system in FIG. 2; and FIGS. 7(a) and 7(b) are explanatory views illustrating the relative position between a workpiece and a grinding wheel in each grinding operation at two stages which are different in the grinding capability of the grinding wheel.

DETAILED DESCRIPTION OF A PREFERRED EMBODIMENT

Figure 1:
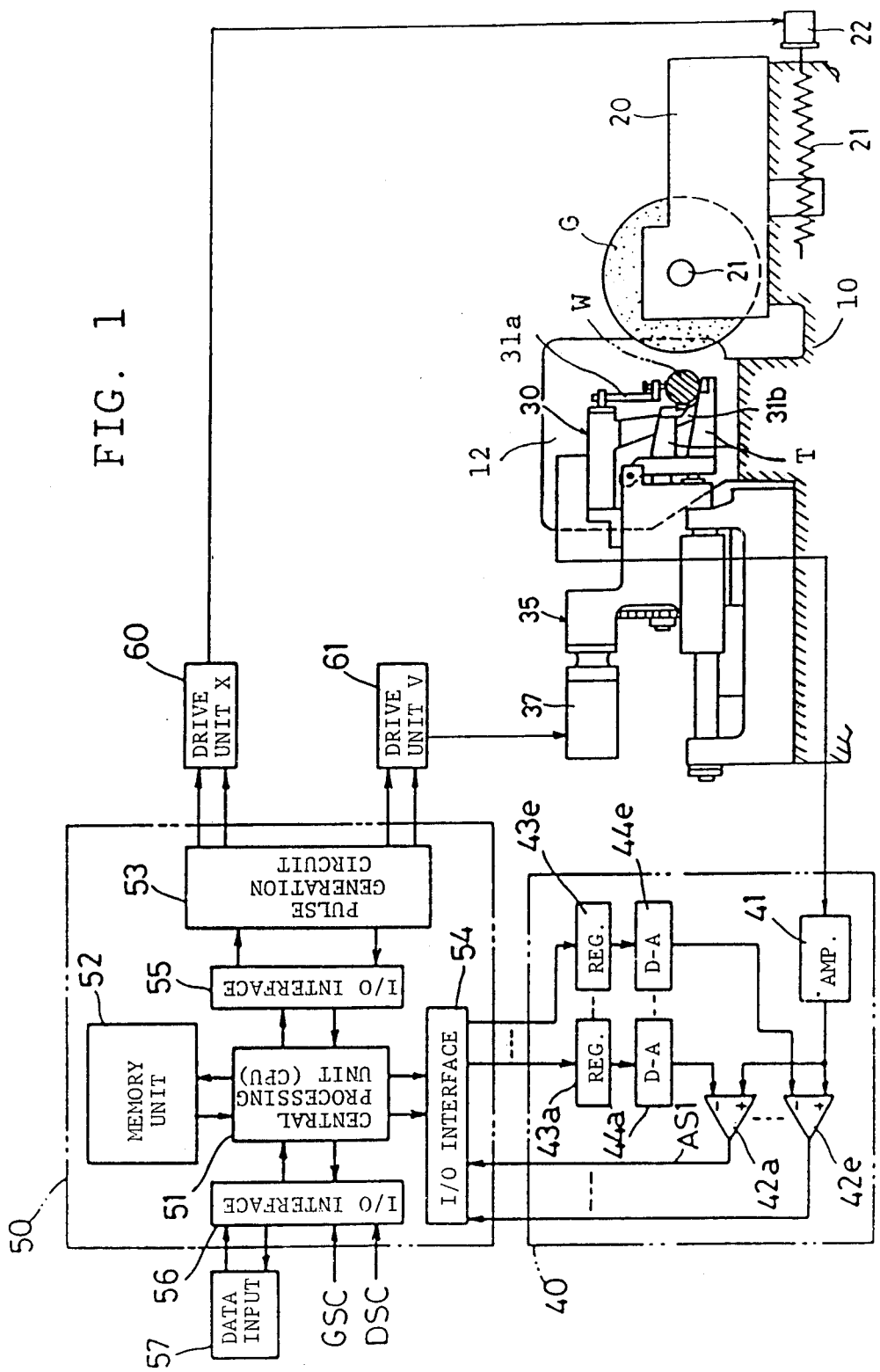
FIG. 1 is a schematic view of a grinding machine according to the present invention, also showing a block diagram of a numerical controller and a size control unit.

Referring to the drawings and particularly to FIG. 1 thereof, a grinding machine according to the present invention is shown having a wheel head 20, by which a grinding wheel G made of hard material such as cubic boron nitride is rotatably carried through a wheel spindle 21. The wheel head 20 is guided on a base 10 for sliding movement in a direction perpendicular to the work spindle axis of a work head 12 which carries a cylindrical workpiece W rotatably about the work spindle axis in cooperation with a tail stock (not shown). The wheel head 20 is movable to be advanced and retracted by means of a feed screw 21 driven by a servomotor 22. The workpiece W may be an automotive crankshaft having one or more portions (crankpins or journals) to be ground.

A sizing head 30 and a steady rest 35 are disposed at the position which faces the grinding wheel G with the work spindle axis extending therebetween. A pair of jaws T of the steady rest 35 are drivingly connected to a servomotor 37 through respective feed screw mechanisms (not shown) and are advanced and retracted upon rotation of the servomotor 37, as disclosed in U.S. Pat. No. 3,967,414 to the same assignee of this application.

A control apparatus for the grinding machine comprises a sizing system, which is composed of the sizing head 30 and a sizing control unit 40, and a numerical controller 50 for performing feed controls in accordance with a numerical control program and several sizing signals output from the sizing control unit 40, as referred to later in more detail. Command pulses output from the numerical controller 50 are input to drive units 60, 61 for driving the servomotors 22, 37 connected thereto.

The numerical controller 50 is composed of a central processing unit (hereafter referred to as "CPU") 51, a main memory unit 52, a pulse generation circuit 53 and input/output interface circuits 54–56. The numerical controller 50 is connected at the CPU 51 with the sizing control unit 40 through the interface circuit 54. The interface circuit 56 is connected to a data input device 57 for inputting machining programs and various other data.

The sizing head 30 is provided with a differential transformer (not shown) which converts the relative displacement of a pair of measuring probes 31a, 31b into a corresponding electric signal, which is input to the sizing control unit 40. After amplified by an amplifier 41 within the sizing control unit 40, the electric signal is input to non-inverted signal terminals of several (five in this particular embodiment) of comparators 42a–42e. Voltage signals corresponding to various set sizes from the numerical controller 50 are input to inverted signal terminals of the comparators 42a–42e, respectively. More specifically, several data representing individual set sizes are held by latch circuits or registers 43a–43e. The latched digital data are converted by associated digital-analogue (D–A) converters 44a–44e into corresponding analogue forms, namely into voltage signals so as to be input as various reference voltages to the inverted signal terminals of the comparators 42a–42e, respectively. Outputs from the comparators 42a–42e are input as sizing signals to the numerical controller 50 through the interface circuit 54.

The machining operation performed by the apparatus as constructed above will be described hereafter. When a machining start command GSC is give to the numerical controller 50, the CPU 51 executes processings shown in FIG. 2. First of all, set size data are transferred to the sizing control unit 40 for storage in the registers 43a–43e, and the processing for setting various feed rates is executed (step 60), as described later in greater detail. Subsequently, the CPU 51 executes processings for moving the grinding wheel G and the rest jaws T in accordance with a feed cycle shown in FIG. 6. That is, pulses are distributed to move the grinding wheel G a distance D0 at a rapid feed rate F0 (step 61) and then, a distance D1 at an air-cut feed rate F1 (step 62). A pulse distribution is further performed to advance the grinding wheel G at a rough grinding feed rate F2 until a first sizing signal AS1 is issued from the sizing control unit 40 (step 63). Upon issuance of the first sizing signal AS1, the rough grinding on the workpiece W is completed. In response to the signal AS1, the CPU 51 executes the processing for advancing a rest head (not numbered) with the jaws T at a rapid feed rate. This can be done by operating a hydraulic cylinder (not shown) incorporated in the steady rest 35, as fully described in the aforementioned U.S. patent. Also in response to the signal AS1, the CPU 51 further effects a pulse distribution to move the grinding wheel G at a first-fine grinding feed rate F3 until a second sizing signal AS2 is issued from the sizing control unit 40 (step 65). When the second sizing signal AS2 is issued, the feed movement of the grinding wheel G is halted, while a pulse distribution to the servomotor 37 is initiated to advance the rest jaws T a set amount at an approach feed rate F6 (step 66) and then, at a feed rate F7 until a third sizing signal AS3 is issued from the sizing control unit 40 (step 67). It is to be noted that the jaws T are brought into contact with the workpiece W in the mid course of the approach feed executed at step 66.

The grinding by the feed of the rest jaws T is completed in the aforementioned manner. Thereafter, the grinding wheel G is infed again at a second fine grinding feed rate F4 until a fourth sizing signal AS4 is issued from the sizing control unit 40 (step 68). Finally, the grinding wheel G is infed at a minute grinding feed rate F5 until a fifth or final sizing signal AS5 is issued (step 70), whereby the plunge grinding of the workpiece W is completed.

According to the present invention, in the above-described grinding cycle, the time point at which the second sizing signal AS2 is issued to start the advance feed of the rest jaws T is delayed gradually as the number of workpieces W ground by the grinding wheel G after each truing thereon increases. The processings to realize such control are executed at step 60 of FIG. 2 as follows:

FIGS. 3(a) and 3(b) show in detail those executed by the CPU 51 at step 60 to delay the issuance time point of the second sizing signal AS2, and FIG. 5 illustrates the manner in which the issuance time point of the signal AS2 is changed.

In an example shown in FIG. 5, a first or earlier stage at which a predetermined number of workpieces W are ground right after each truing of the grinding wheel G is referred to as "dressing stage", while a second or later stage subsequent thereto is referred to as "normal grinding stage". The dressing stage is divided into first to fourth dressing stages ①-④, while the normal grinding stage is divided into first to fourth normal grinding stages Ⓐ-Ⓓ. In the figure, symbols Cn (e.g., C26, C31, C32 . . . ) and Bn (e.g., B50, B51, B52 . . . ) denote various parameters, and numerical data respectively corresponding to these parameters have been stored in advance in the main memory unit 52, using the data input device 57. Further, each of the stages ①-④ and Ⓐ-Ⓓ is settable as desired by inputting data indicating the number of workpieces W. For example, where 1160 workpieces or workpiece portions are ground by the grinding wheel G after each truing, data "1-4", "5-12", "13-20" and "21-28" have been set to specify the first to fourth dressing stages ①-④, and data "29-84", "85-324", "325-724" and "725-1160" have been set to specify the normal grinding stages Ⓐ-Ⓓ, respectively.

Within the dressing stages ①-④, the set size which determines the time pint to issue the second sizing signal AS2 is diminished in turn from C31 to C34 to be diminished on a step-by-step basis. It is to be noted herein that the difference in actual value between each successive two of these parameters C31 to C34 ranges several ten micron meters. The rough grinding infeed rate F2 is increased in turn from an initial rate B50 to B51, to B52 and to B53 which is close to its normal or desired rate B54, and the first fine grinding infeed rate F3 is increased in turn from its initial rate B55, to B56, to B57 and to B58 which is close to its normal or desired rate B59. Within each of the normal grinding stages Ⓐ-Ⓓ, on the other hand, the set size for the second sizing signal AS2 is diminished by a predetermined compensation amount chosen for each normal grinding stage each time a predetermined number of workpieces W are ground. The predetermined compensation amount is represented by any one of the parameters C36-C39, and the predetermined number of workpieces W at which interval the set size is diminished is represented by any one of the parameters B71-B77. For example, the parameters C36-C39 range several micron meters to one micron meter, while the parameters C36-C39 respectively represent numerals "2", "20", "50" and "100".

When the processings shown in FIG. 3(a) are started, a workpiece counter MWC is incremented (step 80), whereafter an ascertainment is made as to whether the current grinding operation is within the dressing stage or not (step 81). Step 82 is then reached if the grinding operation is within the dressing stage. An ascertainment is further made as to which dressing stage is being performed (step 82, 85, 87 and 90). Each of the ascertainments at steps 82, 85, 87 and 90 can be done by comparing the value of the workpiece counter MWC with the aforementioned data, e.g., "1-4", "5-12", "13-20" and "21-28" each of which has been set to specify a corresponding one of the first to fourth dressing stages ①-④. Similarly, the ascertainment at step 81 can be done by comparing the value of the workpiece counter MWC with a numeral "28" or "29" indicating the number of the workpiece W which should be finally machined within the dressing stage or which should be first machine within the normal grinding stage. When it is ascertained that the current grinding is within any one of the first to fourth dressing stages ①-④, the set value DAS2 which determines the issuance time point of the second sizing signal AS2 is set to represent the parameter C31, C32, C33 or C34 for the dressing stage concerned, and the rough grinding feed rate F2 and the first fine grinding feed rate F3 are set to represent the parameters B50 and B55, B51 and B56, B52 and B57, or B53 and B58, respectively (step 83, 86, 88 or 91).

The CPU 51, when given a truing command, executes the processings shown in FIG. 4, whereby the grinding wheel G is trued in a well-known manner at step 120. After each truing operation, the workpiece counter MWC is reset to indicate zero (step 121). Consequently, when a first workpiece W is ground right after each truing operation, it is ascertained at step 82 that such grinding is within the first dressing stage ①, whereby data "C31", "B50" and "B55" are set as the set size DAS2, the rough grinding infeed rate F2 and the first fine grinding infeed rare F3. The routine of the CPU 51 is then directed to step 112 of FIG. 3(b), wherein the set data DAS2 is output along with other sizing set data DAS1, DAS3-DAS5 to the sizing control unit 40, namely to the registers 43a-43e.

The count value of the workpiece counter MWC is incremented (step 80) each time the grinding of the workpiece W is completed. When it is ascertained based upon the content of the counter MWC that the grinding operation is within the second dressing stage ②, the data DAS2, F2 and F3 are varied to represent parameters C32, B51 and B56, respectively. Similarly, as the third and fourth truing stages are entered, the data DAS2 is varied to represent parameters C33 and C34, the data F2 to paràmeters B52 and B53 and the data F3 to B57 and B58, respectively.

In this manner, right after each truing operation when the grinding capability of the wheel G is small, the rough and first fine grinding infeed rates F2, F3 are set to be lower, and the set value DAS2 is set to be larger. However, as the grinding capability of the wheel G is improved with the change of stages from the first truing stage ①, to the second ②, to the third ③ and to the fourth ④, such feed rates are heightened on a step-by-step basis, while the set size DAS2 is diminished on a step-by-step basis. As a result, the size to which the workpiece W is ground due to its spring-back motion at the issuance of the second sizing signal AS2 can be maintained to be a desired size or constant.

When the entrance into the normal grinding stage is detected based upon the count value of the workpiece counter MWC (step 81), prior to the first grinding operation within the normal grinding stage, the set size DAS2 is initially set to represent the parameter C35 (step 93) and the feed rates F2 and F3 are set to represent the parameters B54, B59 (step 95) which are used throughout the normal grinding stage. When the grinding operations is repetitively performed thereafter, the processings at step 97 and those successive thereto of FIG. 3(b) are executed, whereby the set size DAS2 only is diminished gradually although the infeed rates F2 and F3 are maintained as they are (step 96).

More specifically, one of the normal grinding stages Ⓐ - Ⓓ at which the current grinding cycle is being performed is judged based on the value of the workpiece counter MWC in steps 97, 99, 101 and 103, and a compensation interval B35 which is defined by the number of the ground workpieces and a compensation amount B36 are set for the judged normal grinding stage (steps 98, 100, 102 or 105). Subsequently, an ascertainment is made as to whether the set size DAS2 is larger than a theoretical set size C26 which the workpiece W would have if not flexed (step 106), and if it is ascertained to be larger, step 107 is then reached to add "1" to the value represented by the compensation time point determination parameter B37. It is then ascertained whether the value represented by the parameter B37 has reached that represented by the parameter B35 (step 108), and if it has reached that value, the set size DAS2 is compensated by subtracting therefrom the value represented by the parameter B36 (step 110). Then, the parameter B37 is reset to indicate zero (step 111), and the set size DAS2 is output to the sizing control unit 40 together with other set sizes DAS1, DAS3, DAS4 and DAS5 which respectively determine the issuance timings of other sizing signals AS1, AS3, AS4 and AS5 (step 112).

If the set size DAS2 becomes smaller than the parameter C26 representing the theoretical set size, on the contrary, it is varied to indicate the theoretical set size (step 113), so that the set size DAS2 can be prevented from becoming smaller than the theoretical set size.

With these processings, the size that the workpiece W has upon completion of the grinding effected by its spring-back motion can be maintained approximately constant irrespective of the variation in the amount through which the workpiece W returns in the spring-back motion upon issuance of the second sizing signal AS2, in connection with the variation or improvement in the grinding capability of the wheel G after the normal grinding stage begins. This advantageously results in making constant each of the allowance ground by the feed of the rest jaws T and the allowances in the second fine grinding as well as in the minute grinding, whereby a desired roundness can be secured without prolonging the machining cycle time.

Obviously, numerous modifications and variations of the present invention are possible in light of the above teachings. It is therefore to be understood that within the scope of the appended claims, the present invention may be practiced otherwise than as specifically described herein.

What is claimed is:

1. A grinding machine wherein a sizing device is provided for outputting a sizing signal when a cylindrical workpiece is ground to a set size, and wherein in response to said sizing signal from said sizing device, the infeed movement of a wheel head rotatably carrying a grinding wheel is halted and the feed movement of a jaw of a steady rest is started to infeed said workpiece against said grinding wheel, the improvement comprising:

register means for storing said set size;

initial size setting means operable each time said grinding wheel is trued, for setting in said register means an initial set size larger than a theoretical size which determines the time point to output said sizing signal;

size modification means for diminishing said initial set size stored in said register means, gradually with the increase in number of workpieces ground by said grinding wheel; and comparison means responsive to said set size stored in said register means for generating said sizing signal when said workpiece is ground to said set size stored in said register means.

2. A grinding machine comprising:

workpiece support means for rotatably supporting a cylindrical workpiece;

a wheel head rotatably carrying a grinding wheel;

a first feed mechanism for effecting relative infeed movement between said workpiece support means and said wheel head to grind said workpiece by said grinding wheel;

a steady rest having a jaw engageable with said workpiece for canceling the flexing of said workpiece caused by said grinding wheel;

a second feed mechanism for moving said rest jaw toward said grinding wheel to press said workpiece upon said grinding wheel;

a sizing device for generating a dimensional signal representing the size of said workpiece being machined by said grinding wheel;

a sizing control unit including a set size register and responsive to said dimension signal from said sizing device for outputting a sizing signal when said dimensional signal coincides with a set size stored in said set size register;

a numerical controller connected to said first and second feed mechanisms and said sizing control unit for controlling in accordance with a numerical control program and said sizing signal said first and second feed mechanisms in such a manner that the wheel head is first moved to grind said workpiece and then is stopped in response to said sizing signal and that said rest jaw is advanced toward said workpiece upon issuance of said sizing signal so as to press said workpiece upon said grinding wheel; and size modification means for varying said set size stored in said set size register in connection with the increase in number of workpieces ground by said grinding wheel.

3. A grinding machine as set forth in claim 2, wherein said size modification means comprises:

count means for counting the number of workpieces ground by said grinding wheel after each truing thereof;

initial setting means for initially setting said set size in said set size register each time said grinding wheel is trued; and a plurality of additional setting means operable respectively when the content of said count means reaches predetermined values, for respectively setting at least first and second additional set sizes in said set size register, said initially set size being larger than said first additional set size which is in turn larger than said second additional set size.

4. A grinding machine comprising:

workpiece support means for rotatably supporting a cylindrical workpiece;

a wheel head rotatably carrying a grinding wheel, said grinding wheel having a property that its grinding capability is small right after a truing operation thereon but is improved as the number of workpieces ground thereby increases;

a first feed mechanism for effecting relative infeed movement between said workpiece support means and said wheel head to grind said workpiece by said grinding wheel;

a steady rest having a jaw engageable with said workpiece for canceling the flexing of said workpiece caused by said grinding wheel;

a second feed mechanism for moving said rest jaw toward said grinding wheel to press said workpiece upon said grinding wheel;

a sizing device for generating a dimensional signal representing the size of said workpiece being machined by said grinding wheel;

a sizing control unit including a set size register and responsive to said dimension signal from said sizing device for outputting a sizing signal when said dimensional signal coincides with a set size stored in said set size register; and a numerical controller connected to said first and second feed mechanisms and said sizing control unit for controlling in accordance with a numerical control program and said sizing signal said first and second feed mechanisms in such a manner that the wheel head is first moved to grind said workpiece and then is stopped in response to said sizing signal and that said rest jaw is advanced toward said workpiece upon issuance of said sizing signal so as to press said workpiece upon said grinding wheel, said numerical controller including:

discrimination means for discriminating a first stage from a second stage successive thereto with respect to the grinding capability that said grinding wheel has after each truing operation;

feed rate control means for gradually increasing the infeed rate of said wheel head at said first stage and for maintaining the feed rate of said wheel head to be a predetermined normal grinding feed rate at said second stage; and size modification means for varying said set size stored in said set size register with the increase in number of workpieces ground by said grinding wheel at each of said first and second stages.

5. A grinding machine as set forth in claim 4, wherein: said size modification means diminishes said set size stored in said register at a larger rate at said first stage than does at said second stage.

6. A grinding machine as set forth in claim 5, wherein said discrimination means comprises:

counter means for counting the number of said workpieces ground after each dressing operation; and ascertaining means for ascertaining whether the grinding capability of said grinding wheel belongs to said first stage or said second stage, based upon the content of said counter means.

* * * * *